(12) United States Patent
Bando et al.

(10) Patent No.: US 11,556,407 B2
(45) Date of Patent: Jan. 17, 2023

(54) FAST NODE DEATH DETECTION

(71) Applicant: Oracle International Corpoation, Redwood Shores, CA (US)

(72) Inventors: Masakazu Bando, South San Francisco, CA (US); Zuoyu Tao, Belmont, CA (US); Jia Shi, Campbell, CA (US); Kothanda Umamageswaran, Sunnyvale, CA (US); Vijay Sridharan, Santa Clara, CA (US)

(73) Assignee: Oracle International Corporation

( * ) Notice: Subject to any disclaimer, the term of this patent is extended or adjusted under 35 U.S.C. 154(b) by 29 days.

(21) Appl. No.: 16/948,346

(22) Filed: Sep. 14, 2020

(65) Prior Publication Data

US 2021/0081268 A1    Mar. 18, 2021

Related U.S. Application Data

(60) Provisional application No. 62/900,581, filed on Sep. 15, 2019.

(51) Int. Cl.
| | |
|---|---|
| *G06F 11/07* | (2006.01) |
| *H04L 67/1097* | (2022.01) |
| *H04L 43/10* | (2022.01) |
| *G06F 16/28* | (2019.01) |
| *G06F 15/173* | (2006.01) |
| *H04L 43/0817* | (2022.01) |

(52) U.S. Cl.
CPC ........ *G06F 11/079* (2013.01); *G06F 11/0727* (2013.01); *G06F 11/0757* (2013.01); *G06F 15/17331* (2013.01); *G06F 16/285* (2019.01); *H04L 43/0817* (2013.01); *H04L 43/10* (2013.01); *H04L 67/1097* (2013.01)

(58) Field of Classification Search
CPC .............. G06F 11/0727; G06F 11/079; G06F 11/0757; G06F 15/17331; H04L 43/10
See application file for complete search history.

(56) References Cited

U.S. PATENT DOCUMENTS

| | | | | |
|---|---|---|---|---|
| 10,459,791 | B2* | 10/2019 | Tanaka | G06F 16/1827 |
| 10,958,527 | B2* | 3/2021 | Guller | H04L 41/12 |
| 11,012,335 | B2* | 5/2021 | Tervonen | H04J 3/06 |
| 2005/0201272 | A1* | 9/2005 | Wang | H04L 67/1034 |
| | | | | 370/216 |

OTHER PUBLICATIONS

Aguilera, M., et al., "Microsecond Consensus for Microsecond Applications," dated Oct. 13, 2020.
Argyroulis, I., "Recent Advancements In Distributed System Communications," Vrije Universiteit Amsterdam, dated Jul. 3, 2021.

(Continued)

*Primary Examiner* — Nadeem Iqbal
(74) *Attorney, Agent, or Firm* — Vista IP Law Group, LLP

(57) ABSTRACT

Described is an improved approach to implement fast detection of node death. Instead of just relying on multiple heart beats to fail in order to determine whether a node is dead, the present approach performs an on demand validation using RDMA to determine whether the node is reachable, where the approach of using RDMA is significantly faster than the heartbeat approach.

24 Claims, 7 Drawing Sheets

(56) References Cited

OTHER PUBLICATIONS

Ma, T., et al., "X-RDMA: Effective RDMA Middleware in Large-scale Production Environments," dated 2019.
"Dell EMC Solutions for Microsoft Azure Stack HCI Networking Guide," DELL EMC, dated May 2019.
Poke, M., et al., "DARE: High-Performance State Machine Replication on RDMA Networks," HPDC'15, Jun. 15-19, 2015.
Xiao, M., et al., "Catfish: Adaptive RDMA-enabled R-Tree for Low Latency and High Throughput," 2019 IEEE 39th International Conference on Distributed Computing Systems (ICDCS), copyright 2019.
Wang, X., et al., "StaR: Breaking the Scalability Limit for RDMA," IEEE, copyright 2021.
Fu, G., "Implementing RDMA on Linux," Lenovo, Copyright 2018.
Cao, J., "Transparent Checkpointing over RDMA-based Networks," College of Computer and Information Science, Dec. 2017.
Wang, C., et l., "PLOVER: Fast, Multi-core Scalable Virtual Machine Fault-tolerance," 15th USENIX Symposium on Networked Systems Design and Implementation (NSDI '18). Apr. 9-11, 2018.
"Remote Direct Memory Access," IBM, Copyright International Business Machines Corporation 2013, 2017.
Guo, C., et al., "RDMA over Commodity Ethernet at Scale," SIGCOMM '16, Aug. 22-26, 2016.
Kazhamiaka, M., et al., "Sift: Resource-Efficient Consensus with RDMA," Cheriton School of Computer Science, University of Waterloo, Copyright 2019.
Wang, D., et al., "vSocket: Virtual Socket Interface for RDMA in Public Clouds," Association for Computing Machinery, copyright 2019.

* cited by examiner

FAST NODE DEATH DETECTION

CROSS-REFERENCE TO RELATED APPLICATIONS

The present application claims the benefit of priority to U.S. Provisional Application No. 62/900,581, filed on Sep. 15, 2019, which is hereby incorporated by reference in its entirety.

BACKGROUND

There are many types of distributed systems where proper operation of the system is premised on the ability of the nodes in the system to be able to communicate with one another. As just one example, a database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., nodes) appear as if they are one system to applications and end users.

In order for the database cluster to operate properly, these servers (e.g., nodes) will need to be able to communicate with one another in order to perform work. The database cluster as a whole cannot work properly if there is a breakdown of communications between the nodes. For example, many aspects of cluster interactions (e.g., lock management, cluster management, and status updates) cannot function properly if one or more nodes in the cluster are unable to communicate with the other nodes.

One conventional approach that can be taken to identify communication breakdowns between nodes in a distributed system is the use of network heartbeat processing. This approach is usually driven by a first node that, when sending a communication to second node, will identify when it does not receive a responsive communication or acknowledgement back from that second node. The conventional approach operates by having the first node start a timer when it sends the communication to the second node. If the first node does not receive the responsive communication/acknowledgement back within a timeout period, then the first node can make a determination that the second node is potentially a dead node. After determining that the second node is having problems and/or is a dead node, the first node can then take action to address the communications issues with the problematic node. For example in a clustered system, one type of resolution that can be taken is to initiate an eviction proceeding to evict the second node from the cluster.

However, the system really needs to be sure that a given node has a problem before taking an action such as eviction, since the eviction process is fairly expensive due to the requirement to move data and processing between nodes and to initiate a possible restart, and therefore it is desirable to avoid any unnecessary or premature evictions. Therefore, the timeout period is usually set to a very long time period to conservatively determine when a node should be identified as a problematic node. Since the timeout period is set to a fairly lengthy period of time to avoid premature evictions, this means that the first node may need to undergo a lengthy wait time period before it can even confirm the existence of the problem, much less take actions to address the problem. A node that is inaccessible to the rest of the cluster will end up causing brownout by being unable to complete its requests. Clients connected to other nodes will be unable to complete their work because a lot of cluster compute workload is consensus based. The inability of the inaccessible node to partake in the consensus protocol until the node is determined to be unavailable and removed from the cluster will cause a delay to the processing on the remaining cluster nodes. This could result in severe latencies and delay periods, where database operations are blocked at a given node for that entire period of time. The delay in processing the database operations could create significant real-world problems for the organization/enterprise that uses the database as a result of the latency.

Therefore, there is a need for an improved approach to identify problematic nodes which addresses the issues identified above.

SUMMARY

Embodiments of the present invention provide an improved method, a computer program product, and a computer system to detect problematic/dead nodes.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Embodiments of the present invention provide an improved method, a computer program product, and a computer system to detect problematic/dead nodes. Instead of just relying on multiple heart beats to fail in order to determine whether a node is dead, the present approach performs an on demand validation of whether the node is reachable that is significantly faster to confirm as compared to alternative approaches that only uses heart beats to validate the health of nodes in the system.

Figure 1:
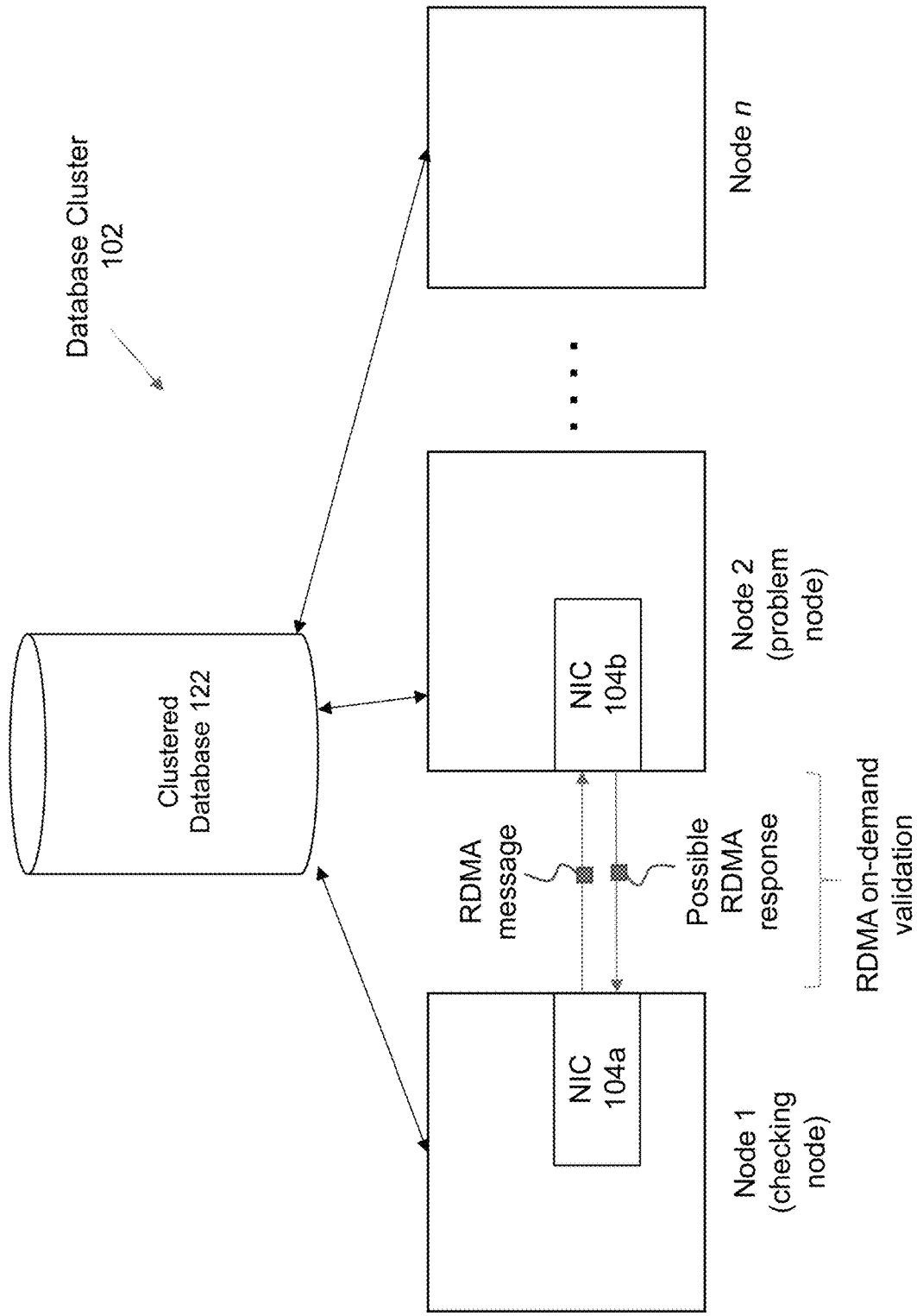
FIG. 1 shows a system for implementing some embodiments of the invention.

FIG. 1 illustrates a system for implementing some embodiments of the invention. The below description is being provided by explaining embodiments of the invention on an illustrative basis in the context of the database cluster 102. It is noted, however, that the inventive concepts described herein are applicable to multiple computing scenarios and environments, and is therefore not to be limited in its application only to database clusters unless expressly claimed as such.

As illustrated in FIG. 1, a database cluster 102 is provided to handle workloads from one or more clients that seeks to access a database through one or more application/web servers. The database cluster includes clustered database storage 122, e.g., that is stored within multiple storage devices within a storage pool. The clustered database may have one or more tables that are operated upon by the one or more clients, where the clients operate one or more user stations to issue SQL commands to be processed by the database. The database cluster 102 includes multiple interconnected computers or servers that appear as if they are one server to the end users and applications that seek to access the database through the nodes 1-n. There is a one-to-many relationship between the underlying database stored within a storage pool and the instances. Therefore, the data stored within the storage devices of the storage pool are commonly accessible by any of the nodes/instances that make up the cluster 102. The user stations and/or the servers within the system comprise any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs.

In general, database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

However, some or all of these properties may be violated if a failure occurs within the cluster, where nodes within the cluster become unable to communicate with one another. Communication failures may occur between nodes in the cluster, e.g., due to hardware, software, and/or system workload problems. Various approaches may be taken to identify circumstances where a communications problem or failure has occurred. For example, network heartbeat processing can be used to determine whether one or more nodes in the database cluster has failed or is no longer communicatively available within the database cluster. A node within the database cluster may fail because it has been powered down by accident or if it suddenly crashes before sending out any type of communication to notify other nodes that is failing. Because the particular node was not able to communicate its health/status via the network communication channel, no other node in the database cluster may be aware of its failure.

Network heartbeat processing can be used to resolve these types of issues. Normal operations for network heartbeat processing is for each node to send out a heartbeat signal to all other nodes in the cluster and to record the heartbeat responses received. When a first node detects that a second node has not responded to its heartbeat after a period of time (e.g., timeout period), the first node may begin the eviction process, but only after waiting the expiration of the timeout period.

However, as previously noted, it is important for the system to be fairly certain that a given node has a problem before evicting a potentially problematic node, since the eviction process can be very expensive due to the requirement to move data and processing between nodes and to initiate a possible restart. This is the reason that conventional heartbeat processing mechanisms use timeout period that are usually set to a very long time period to conservatively determine when a node should be identified as a problematic node. Since the timeout period is set to a fairly lengthy period of time to avoid premature evictions, this means that the first node may need to undergo a lengthy wait time period before it can even confirm the existence of the problem, much less take actions to address the problem. A node that is inaccessible to the rest of the cluster will end up causing brownout by being unable to complete its requests. Clients connected to other nodes will be unable to complete their work because some or all of the cluster compute workload may be consensus based. The inability of the inaccessible node to partake in the consensus protocol until the node is determined to be unavailable and removed from the cluster will cause delay to the processing on the remaining cluster nodes. This could result in severe latencies and delay periods, where database operations are blocked at a given node for that entire period of time. The delay in processing the database operations could create significant real-world problems for the organization/enterprise that uses the database as a result of the latency.

Embodiments of the invention provides an improved approach to verify the health of a node that is much faster than the heart beat processing approach. In particular, RDMA on-demand validation is performed in the current embodiments of the invention to confirm the health of a potentially problematic node. The RDMA (remote direct memory access) protocol is a standard that has been developed to perform direct memory access in a remote manner of one computing device from the operations of another computing device. This is an approach whereby the respective network interface devices (e.g., a network interface card or network adapter) that support RDMA at the database system and at the storage can directly perform direct memory access (DMA) operations based upon a request from a remote system.

In the system of FIG. 1, both node 1 and node 2 each comprises one or more communications/storage devices or infrastructure that are configured to support RDMA, such as a network adapter, storage adapter, network monitor, and/or a cluster manager. The network adapter (e.g., a RDMA-supported network interface card or "NIC") is a circuit board or card that is installed in a computer so that the computer can be connected to a network. In the current example, node 1 includes a NIC 104a and node 2 includes a NIC 104b. A network adapter (such as NIC 104a or 104b) provides the computer with a dedicated, full-time connection to a network, where communications between the nodes of the database cluster are transmitted via the network adapters on each respective node via network communication channels(s).

With regards to the on-demand validation, after the first heart beat fails, a RDMA message is issued from the checking node to the problem node, rather than continuing heart beats. Any suitable type of RDMA message maybe employed, such as a RDMA ping or a RDMA read request. If the RDMA message is successfully processed by the recipient node, then this is an indication that the node is sufficiently alive and/or reachable such that the node should not be evicted. On the other hand, if the RDMA message is not successfully processed by the recipient node, then this situation is indicative of the recipient node being unreachable and thus a failed node eligible for eviction.

Since RDMA messaging can be completed in a very small amount of time (e.g., in a period of just few microseconds), this approach therefore provides an approach to validate the health of a node using a mechanism that is much faster than the heartbeat approach. This allows the system to very quickly confirm the health of a node, thereby speeding up the process to evict a dead node. Even a few seconds of extra downtime for an enterprise grade distributed system can be costly, and thus this optimization is a significant enhancement over the heartbeat approach.

Figure 2:
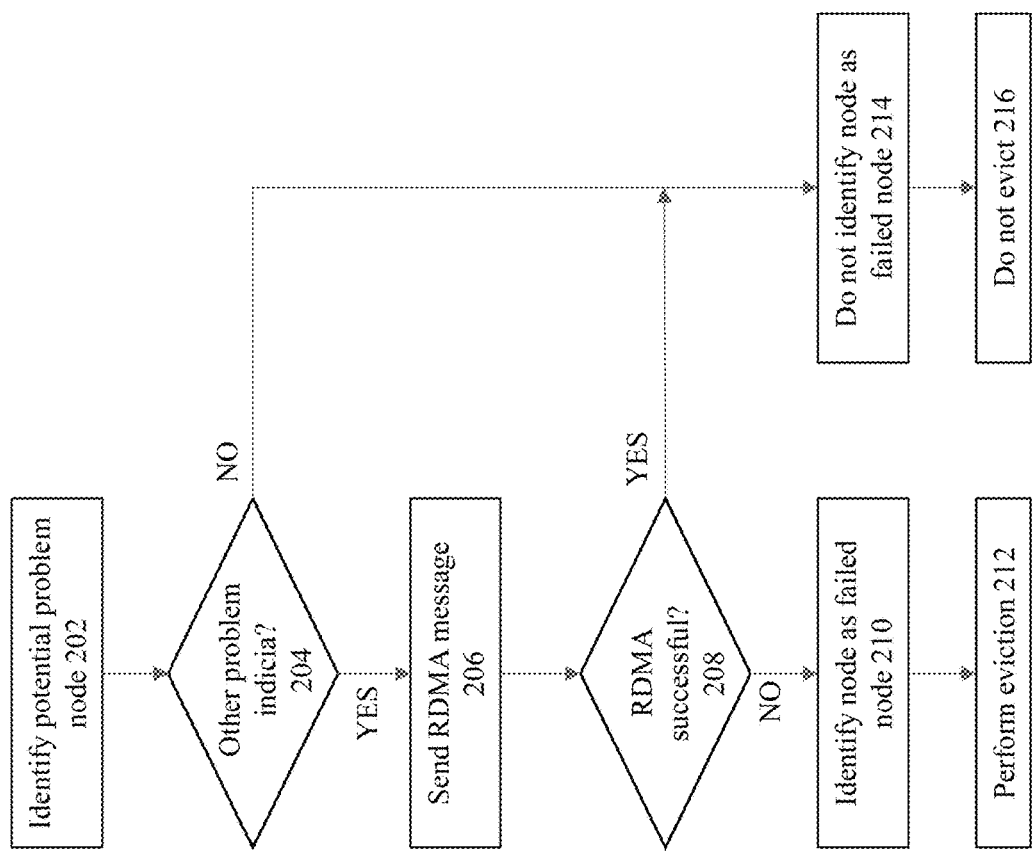
FIG. 2 shows a flowchart of an approach to implement RDMA messaging to perform in-demand validation of nodes according to some embodiments of the invention.

FIG. 2 shows a flowchart of an approach to implement RDMA messaging to perform on-demand validation of nodes according to some embodiments of the invention. At 202, a potentially problematic node is identified. For example, a heartbeat mechanism may identify a node a being potentially problematic due to a missed heartbeat from that node.

At 204, before sending any RDMA messages, the process may optionally make an additional check of other indicia of the node health status. The reason to take this step is because it may be possible to take advantage of obtaining some additional information upfront that would indicate whether the potential problem with the node is because the node is actually dead, or if there is merely a software issue in the node that may clear itself up without requiring an eviction. If the node is undergoing relatively minor software-related problems that may clear itself up, then it is not desirable to even undergo the RDMA process and possibly have failed RDMA messaging result in unnecessary evictions of the node.

For example, the TCP (transmission control protocol) status of the node may be checked before sending any RDMA message. The reason to make the TCP status check is because it may be possible to take advantage of knowing the TCP connect status of the node as an initial check to make a preliminary determination whether the node is either a dead node, or if the problem is a minor software-related issue in the node. If the TCP connect status is indicative that the remote node is still alive, albeit with a relatively fixable software or kernel problem, then there is no need to proceed with RDMA messaging. Instead, the process will proceed to 214 to categorize the node with a status indicative as a non-failed node, and this at 216 the decision would be made to not evict the node.

If the check of the additional information at 204 indicates the possibility of a failed node, then the process will continue onward to step 206 to implement RDMA messaging. The RDMA messaging may employ any suitable type of RDMA messages to send from a first node to a second node. For example, a sequence to perform a simple RDMA client-server ping-pong messaging may be employed to see if the RDMA messaging can be successfully completed at the recipient node. A remote ping (e.g., "rping") may also be employed to check the RDMA connection between the two nodes. In addition, an RDMA performance test may also be implemented using the appropriate RDMA commands.

While not necessary to actually perform reads or writes, it is also possible to implement messaging at step 206 to perform RDMA read and write commands (instead of just the RDMA ping). When an RDMA read is performed, a section of memory is read from the remote host. The caller specifies the remote virtual address as well as a local memory address to be copied to. Prior to performing RDMA operations, the remote host must provide appropriate permissions to access its memory. Once these permissions are set, RDMA read operations can be conducted without involving the remote kernel. The RDMA write is similar to RDMA read, but the data is written to the remote host. RDMA write operations may also be performed without involving the remote kernel.

A determination is made at 208 whether the RDMA messaging was successfully performed between the sending node and the recipient node. If successful, then this is indicative of the node not being a failed node, and therefore the process continues to 214 to categorize the node with a status indicative as a non-failed node, and at 216 the decision would be made to not evict the node.

However, the RDMA messaging may not been successfully performed between the sending node and the recipient node. In this situation, the process continues to step 210, and the node is identified as being a failed node. Thereafter, at step 212, the node may be evicted from the database cluster.

In some embodiments, a client side program and a server side program are used to implement the invention. The server side program accepts connections (TCP) from clients to setup and register RDMA access. Once the setup is complete, any client side program can issue RDMAs to the server node. Since the approach is just using the RDMAs to obtain completion statuses, the size and content of the RDMAs do not matter, which means that the size can be kept to just a small number of bytes to minimize network bandwidth usage.

Figure 3:
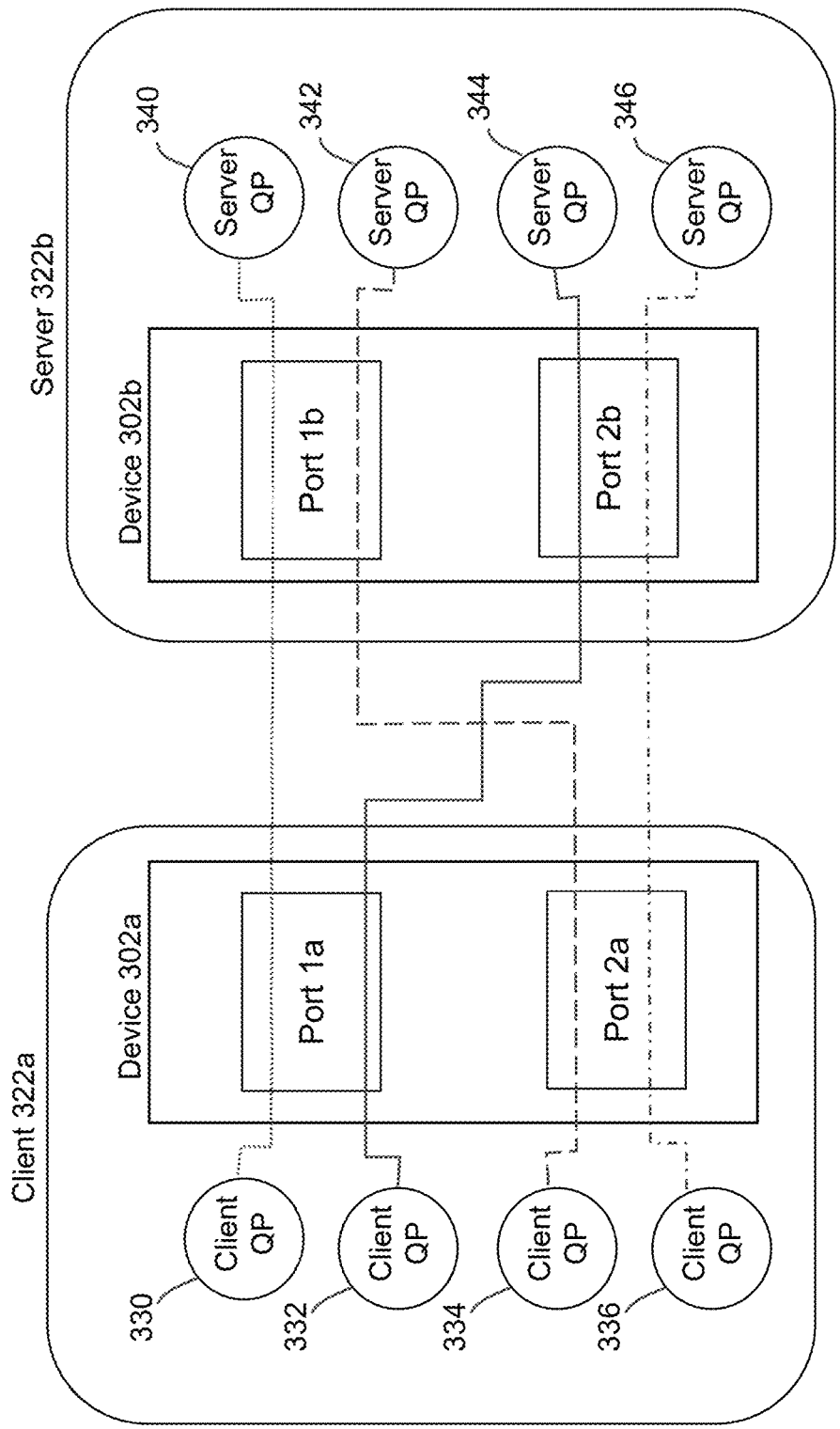
FIG. 3 illustrates a possible configuration for implementing some embodiments of the invention, where the configuration includes a client and a server.

FIG. 3 illustrates a possible configuration for implementing some embodiments of the invention, where the configuration includes a client 322a and a server 322b. The client includes a RDMA-enabled NIC device 302a, and the server also includes a RDMA-enabled NIC device 302b. Each NIC device 302a and 302b includes two ports, with ports 1a and 2a at NIC 302a, and ports 1b and 2b at NIC device 322b.

To implement the RDMA-based testing/messaging, various queue pairs (QPs) may be established between the client 322a and the server 322b. A QP is the equivalent of a socket at a very high level, which can be operated in various modes. For example, the QP can be operated in a Reliable Connected (RC) mode, which is a peer-to-peer OS level connection such as TCP. However, unlike TCP, the RC mode is not a streaming service, but is instead a mechanism to exchange datagrams as well as perform RDMA and atomics. In addition, QP may be used to implement an Unreliable Datagram (UD) mode, which is very similar to UDP. QP may also be used to implement the Unreliable Connection (UC) mode.

In a current embodiment, instead of just sending RDMA messages over a single connection, the RDMA messaging is actually sent over multiple separate connections over the multiple ports. For example, as shown in FIG. 3, RDMA messaging in the current example is performed over four different connections between the client and the server— client QP 330 connects to server QP 340, client QP 332 connects to server QP 342, client QP 334 connects to server QP 344, and client QP 336 connects to server QP 346.

In this scenario, the processing will identify an evictable problem with a node only if all of the connections come back with an error. In other words, if the RDMA messaging is successful over even a single one of the connections—even if it fails over the other three connections—then in one embodiment the system will nonetheless not identify the node as a failed node. The reason to take this approach is because node eviction is a very costly and draconian solution within a database system, and therefore the system may choose to be very conservative when it comes to classification of a node as a failed node to reduce the incidence of false positives. Of course, other embodiments of the invention may take a different approach to identify failed nodes having other combinations the numbers of failed RDMA connections to determine the existence or non-existence of a failed node, e.g., where other numbers of successful connections are used to identify a failed or non-failed node, and these other approaches are also within the scope of embodiments of the invention.

Illustrative Embodiment

This document will now provide a detailed description of an illustrative implementation of some embodiments.

As a general matter, it is noted that some factors that may affect node reachability latency include, for example, (a) latency to determine that a node is reachable, and/or (b) latency to determine that a node is unreachable. Reachability can be based on actual responses from the server while unreachability is based on the lack of responses, since an unreachable node is not able to communicate their status. The present approach allow both latencies to be minimized. In addition to minimizing latency, the present approach minimizes false positives (reporting an available node to be unavailable) and false negatives (reporting an unavailable node to be available), where minimizing these errors are important for maximizing resource utilization.

To avoid unnecessary evictions, some embodiments will classify a first type of node as experiencing "node failure" or "node unreachability" that warrant node evictions, and will classify other nodes as a second type of node as being "reachable" that do not warrant eviction—even if the nodes in the second type are nonetheless experiencing some problems. To explain, consider that a node may be experiencing a local software problem that would be easily resolved given a small period of time, and thus should not be identified as a node failure sufficient to cause the node to be evicted form the database cluster. For example, a software situation may exists where the server process for a local cell or database node has died (e.g., based upon either an unexpected fault or a graceful planned shutdown), and a simple restart of that server process would allow that node to become fully functioning again. In this situation, it would not make sense to undergo the expense of evicting the node from the database cluster. In contrast, consider the situation where a node experiences a power loss, sudden hard shutdown, or a kernel panic, where the TCP connection to the client indicates a severe problem, and thus the system may wish to classify nodes that experience these types of problems as a failed node or an unreachable node sufficient to warrant a node eviction, since these node problems are not expected to be quickly resolved by themselves.

Some embodiments utilize a client-side library that can be linked to client processes, as well as using a server-side process. As previously noted, the server and client take advantage of RDMA supported hardware for fast communications.

With regards to connection establishment, each client process should know which servers to connect to. A set of information is utilized that describes a server endpoint as the GUID, where each client is provided the GUIDs of all server endpoints. The GUID for a single server contains an IP address that can be used to communicate with the server daemon. Each IP address represents a network interface, and the network interfaces may have multiple ports where QPs can be set up.

The RDMA operations may fail due to device port failure, rather than true node unavailability. Since there are multiple ports for both the client and server, it is ideal to keep multiple connections between a server and client pair. This disclosure will refer to each unique pair of client port and server port as a path. FIG. 3 illustrates the four different paths that exists between the same client and server.

A single path consists of the client QP and server QP, which may also be referred to as a send queue (SQ) and a receive queue (RQ). These QPs are unique to the path. However, in some embodiments all QPs will share the same completion queue (CQ). In operation, a work request is generated where a send work request is posted into the SQ to send data to a remote node. This is followed by posting a receive work request into the RQ to receive data. The posted work request can then be handled as appropriately. Once a request is completed, a work completion (WC) is posted into the CQ. It is the successful completion of this sequence of operations that indicates that a given node is not a failed node and/or is reachable.

Before performing RDMA operations (e.g., reads/writes) from the client side, the system exchanges information with the server (e.g., IBVerbs information such as the rkey and qp_num, where the IBVerbs library in RDMA is a library that allows userspace processes to use RDMA "verbs" to perform network operations). To perform the data exchange, the system will use sockets and communicate over TCP. A network port is used for the TCP connection, but the system will assume that there is a specific network port reserved, one that both the server and client programs have agreed upon and have access to. Note that this network port is different from the physical port on the NIC that have been referred to for the QPs.

In some embodiments, there is only a single TCP connection that is created between the same server and client, and path information is exchanged using that TCP connection. The TCP connection and data exchange for a single path uses some or all of the following steps: (a) client creates a QP, starts at initialized state; (b) if the TCP connection is available, the client sends required IB Verbs data through TCP connection with same port configuration; (c) if the TCP connection is unavailable, the client resets the TCP connection and marks the path for sending, where once the TCP connection comes up, all paths that are marked for sending are sent; (d) the server stores received data as client resources; (e) the server creates and transitions the QP to receiving state; (f) the server sends required IB Verbs data through the same TCP connection; (g) the client stores received data into the corresponding server resource; and (h) the client transitions the QP to sending state.

The client will repeat the above steps for each path. Upon completion, the client is able to submit RDMA operations to each of the QPs. Both client and server store the sockets used for the TCP connection in their resources, and the TCP connection remains open to facilitate the reconnection upon unsuccessful RDMA operations. The TCP messages will follow a format that allows versioning, where for each TCP message the client sends a header having a version number and an operation code. The server side will then read the number of bytes that is based on the operation and version number.

In terms of resource management, for the client, all server resources are created upon first use, and cached using their GUIDs for further usage. These server resources are only destroyed upon program termination. Note that sub-resources such as QPs and sockets should also be properly managed.

On the server side for resource management, the server creates new resources for clients and caches the resource via the client's IP. The server does not manage client resources at a client level but rather manages individual QPs and sockets. QPs and sockets are unlinked, and their resources are managed separately by design for high availability. In some embodiments, the server should manage QPs and sockets separately. This is due for example, to the possibility of a QP error, e.g., where a client QP malfunctions. For example, unexpected data loss during an RDMA operation can result in invalidation of the QPs and the client will need to communicate with the server to fix the QP. The TCP connection is open, and the client is able to quickly send over new QP information. If socket resource management depended on an associated QP, the server closes the TCP connection as soon as the server QP goes down. The client would then need to restart the TCP connection. In addition, there is the possibility of a port down/up event, where the TCP connection does not survive the port down/up event while the QPs do survive. Once, the port is back up, the client can continue to use the existing QP for node reachability queries and repair the TCP connection in the background. If QP resource management depended on an associated TCP socket, the server destroys the QP as soon as the TCP connection goes down. The client must then communicate over TCP in order to reestablish a working QP.

For sockets, the server is already polling all sockets for incoming TCP connections. Once a poll results indicates an error (e.g., client shutdown), the socket is closed. Both QP and TCP resources are linked to a client's IP address in order to limit the amount of active resource per client.

With regards to possible integration with other applications, in some embodiments a higher-level application may communicate and/or coordinate to the client program about node reachability. The request is invoked by specifying a single server (via GUID). The client fetches the resources belonging to that particular server and performs an RDMA operation. The RDMA operation is performed simultaneously to all paths that exist between the client and that server. The query will return from a successful RDMA operation, or by a timeout. This timeout value varies depending on the path states at the beginning of the query.

The single path evaluation situation will now be described. In the single path scenario, the system would check the availability of the node on the other end by performing some or all of the following: (a) if TCP is down, the node is reachable; (b) if QP is down, and server returns data over TCP, the node is reachable; (c) if QP is up, then performing the following additional steps; (d) submit an RDMA operation to the client QP attached to path; (e) poll on the CQ for the QP until receive a work completion; (f) if successful work completion, then node is reachable; (g) if unsuccessful work completion and the TCP is up, the node is unreachable, where the system still attempts to connect to the server over TCP to reset the QP; and (h) if reach timeout without a work completion, the node is reachable.

Figure 4:
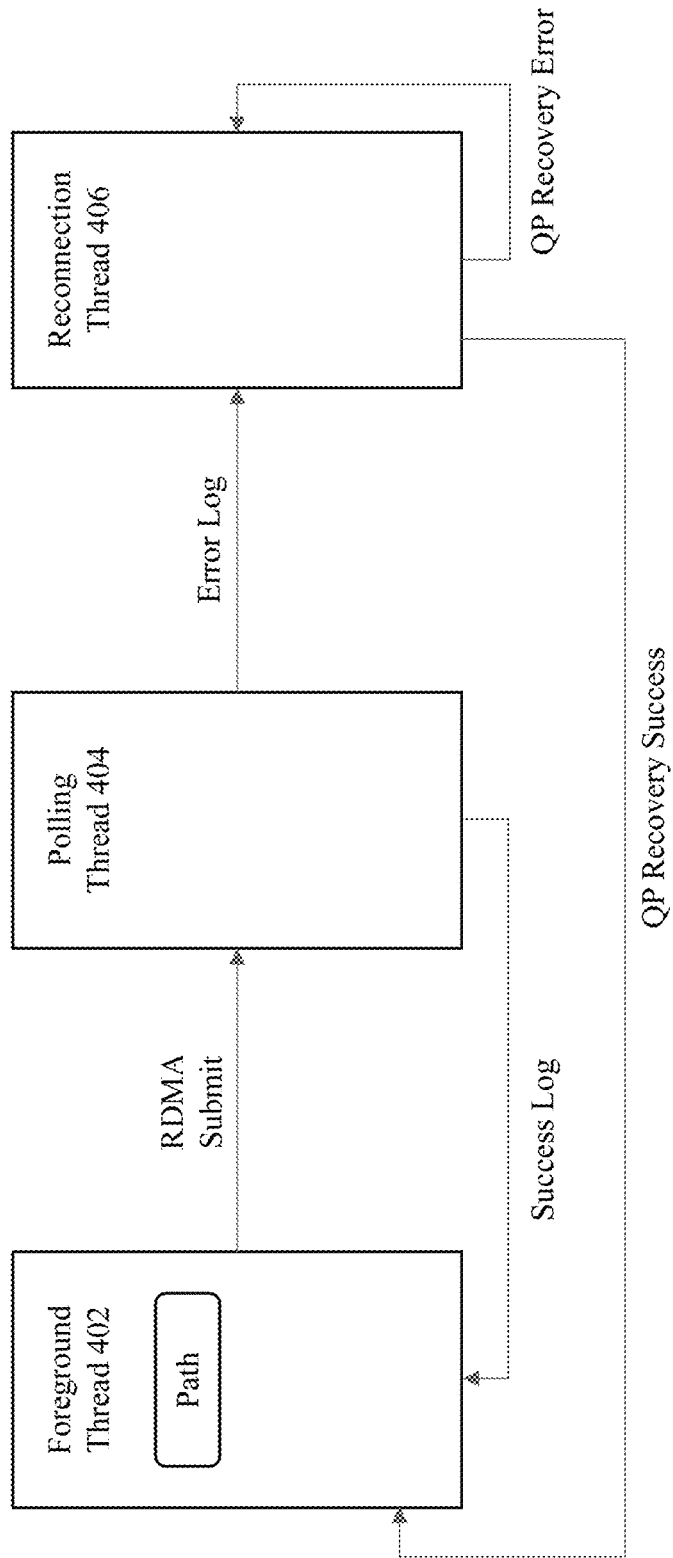
FIG. 4 shows multiple thread processes according to some embodiments of the invention.

For the multi-path situation, the multi-path scenario corresponds to multiple ports that are available on both client and server side. To simultaneously check each path efficiently, the three different thread processes as shown in FIG. 4 may be employed. A foreground thread (FT) 402 is used, where this is the thread that the query was issued upon. A polling thread (PT) 404 is employed to manage certain steps pertaining to polling. The FT 402 performs the RDMA submits with respect to the PT 404. The PT 404 generates error logging directed to a reconnection thread (RT) 406, with the RT 406. The PT 404 also generates success logging directed to the FT 402.

To coordinate which thread should be processing a given path, a path has an associated owner label. The owner label can refer to FT, PT, or RT. Each thread will ignore paths that they are not an owner of, where FIG. 4 describes the ownership flow for a given path. In this diagram, "Log" is analogous to a work completion. In addition to the task breakdown between the threads, it is also helpful to illustrate when queries will return reachable or unreachable.

The foreground thread (FT) is the same thread as the caller thread. A path owned by the FT indicates that the associated QPs have not experienced prior issues. The FT performs the following for each path that the FT is an owner of and belongs to the queried server: (a) submit an RDMA operation to the QP of the path; (b) updates the ownership to PT.

At this point, the FT does not own a single path of the queried server. The FT continuously waits for path owner updates until the timeout unless there's an early return from a successful RDMA. Otherwise each path may be retried as many times as it fits within in the timeout. For checking the updates, there are various possible options. A default option in some embodiments pertain to a condition variable, where each set of paths per server has a condition variable that allows the FT to wait on updates from the PT or RT. Whenever the PT or RT updates a path label, they will send a signal to the FT. In an alternative embodiment, a "busy waiting" approach can be taken, where the FT simply uses an outer timeout loop to continuously check path owner label updates. This alternative may serve to reduce latency and/or overhead, while possibly having worse CPU utilization as compared to the condition variable approach.

The polling thread (PT) may own a path that indicates that there is a submitted RDMA operation that has not generated a work completion. All QPs of all paths share the same CQ. Thus, the PT is able to continuously poll a single CQ for new work completions (WC) for any QP. Upon receiving WCs, the PT performs the following for each WC: (a) if the WC is successful, transfer ownership of the corresponding path to the FT; (b) if the WC is unsuccessful, transfer ownership of the corresponding path to the RT; (c) send a signal to FT if transfer was to FT. It is noted that in some embodiments, no signaling s performed to the RT, since the RT operates without signals.

The reconnection thread (RT) may own a path that indicates that the QPs of that path are experiencing issues and must be reset. The RT also manages client sockets and repairs them when possible. The RT continuously polls on socket sets for TCP connections. The socket will either be ready for write, ready for read, or broken.

A background reconnection thread (RT) iterates at intervals rather than the event-based mechanism of the RT. The purpose of the background RT is to limit how often paths are reconnected. For a server that is down, the RT would constantly attempt to reconnect, unnecessarily using CPU. Even if a path is owned by the background RT, if a path receives a new query, the system immediately tries to reconnect. The BGRT is a mechanism for lazily reconnecting paths in between queries.

With regards to a minimum supported query interval, on the client side, within each server resource, the system keeps track of the timestamp since the last node reachability query as well as the evaluated status from that query. There is a preconfigured minimum query interval that is currently set to 10 µs. If a new query comes within the minimum interval, simply return the cached status back to the requesting process. This feature exists to limit resource usage. The actual availability information is still accurate as performing the RDMA will take around 10 µs as well.

With regards to a client port failure, the client keeps track of its own port failures. Each thread can take advantage of the client port status and reduce unnecessary work when a port is down. For example, the FT can avoid sending an RDMA request using paths with an unavailable port as the request would just fail. The PT will get a work completion, but because the port is down, the completion will be an error, and thus the path will be passed to the RT. The RT defers repairing QPs on the same port as the recovery would fail.

Figure 5:
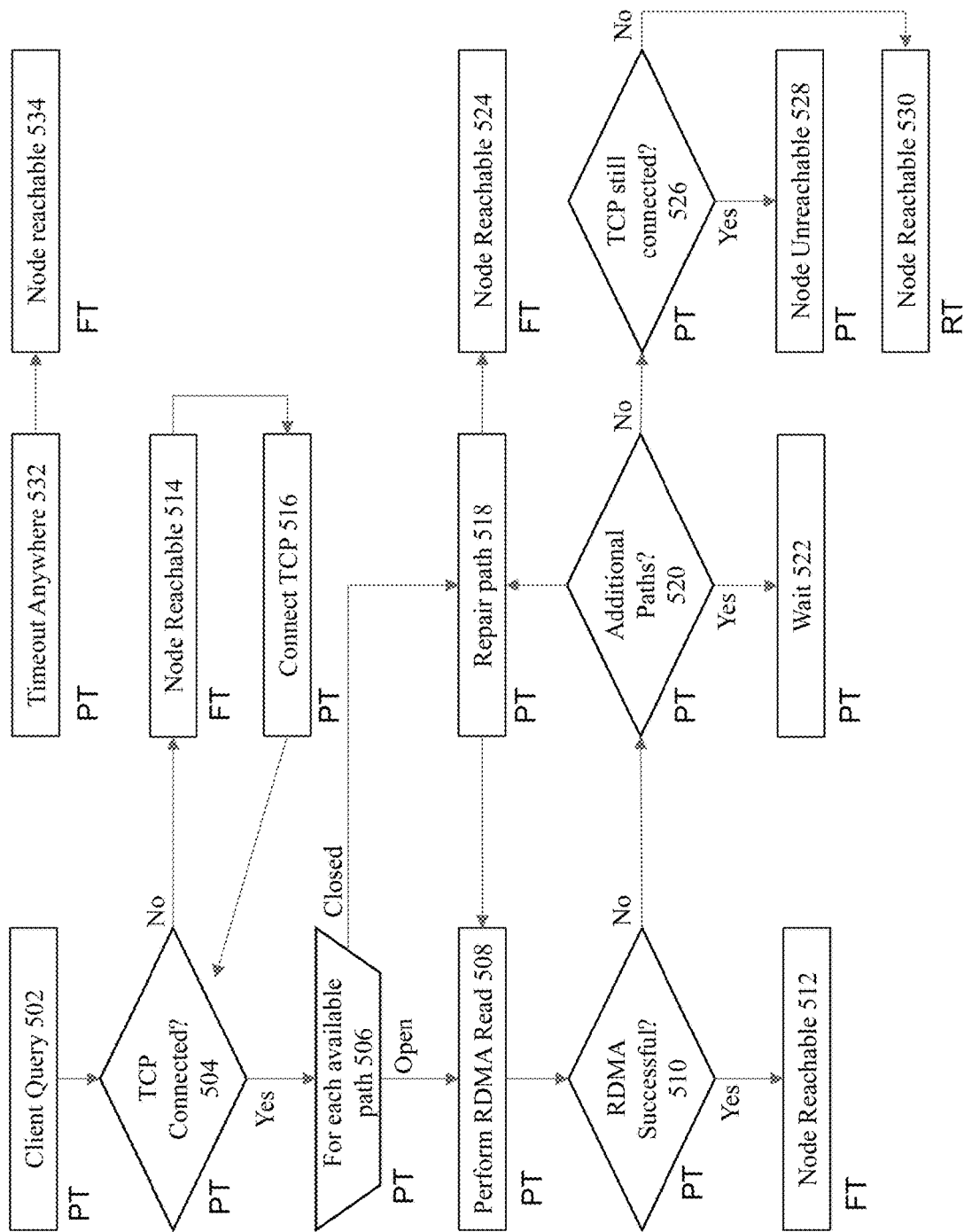
FIG. 5 shows a detailed flowchart of an approach to implement some embodiments of the invention.

FIG. 5 illustrates a flowchart of the above-described processing. The stages of this process are identified in the figure as being performed by each of the respective FT, PT, and RT threads. It is noted in the process flow that if a timeout is identified anywhere (step 532), then the node is designated as a reachable node (534). A node that is designated as being reachable would not be identified as a candidate for eviction from the database cluster.

At 502, a client query is issued to implement the validation of the server. However, before engaging in RDMA messaging, a determination is made at 504 regarding the state of the TCP connection. As previously noted, if the TCP is not connected for the problematic node, this means at 514 that the node is still reachable, since if the TCP is broken then it is reachable. At 516, the system connects to the TCP.

If the TCP connection is still reachable, then 506 operates additional steps for each available path. For a closed path, the processing proceeds to 518 to repair the path. A determination is thereafter made at 524 that the node is reachable.

For an open path, the processing proceeds to 508, e.g., to perform a RDMA read. A determination is made at 510 whether the read is successful. If so, then at 512 the determination is made that the node is reachable. If not, then the processing proceeds to 520 to determine whether there are any additional paths. If so, then at 522, a wait state is entered for the other paths.

If there are not additional paths, then a determination made at 526 whether TCP is still connected. If TCP is still connected, then at 528, the node is identified as being unreachable. This means that the node is eligible at this point to be evicted from the cluster. If TCP is not connected, then at 530, the node is identified as being reachable.

Therefore, what has been described is an improved method, a computer program product, and a computer system to implement fast detection of node death. Instead of just relying on multiple heart beats to fail in order to determine whether a node is dead, the present approach performs an on demand validation using RDMA to determine whether the node is reachable, where the approach of using RDMA is significantly faster than the heartbeat approach.

System Architecture

Figure 6:
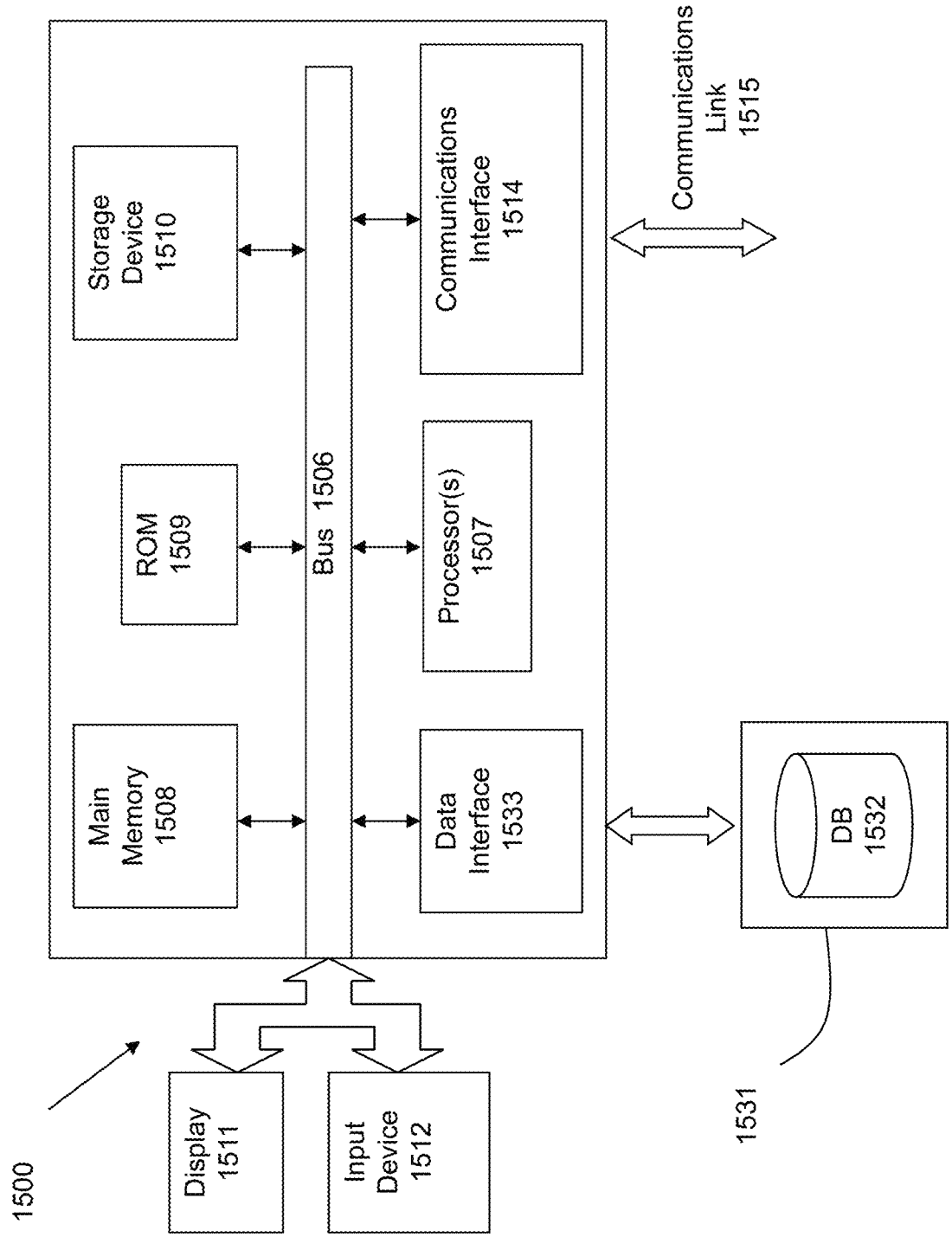
FIG. 6 is a block diagram of an illustrative computing system suitable for implementing an embodiment of the present disclosure.

FIG. 6 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
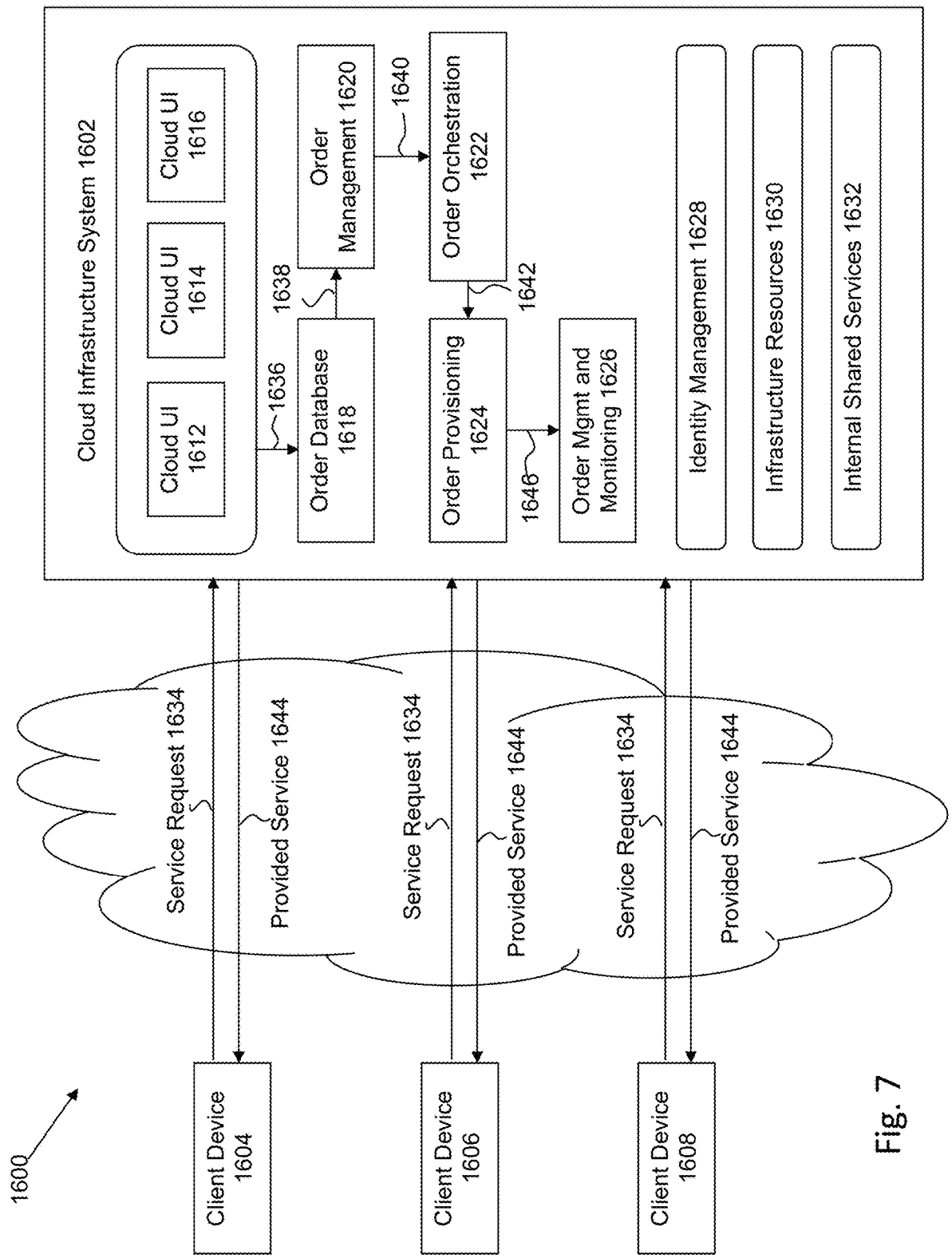
FIG. 7 is a block diagram of one or more components of a system environment by which services provided by one or more components of an embodiment system may be offered as cloud services, in accordance with an embodiment of the present disclosure.

FIG. 7 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for FIG. 6. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloudservices via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
    identifying that a database node is experiencing a communications problem;
    implementing RDMA messaging to the database node in response to identifying that the database node is experiencing the communications problem;
    determining whether the RDMA messaging is successful; and
    identifying the database node as a failed node if the RDMA messaging to the database node is unsuccessful.

2. The method of claim 1, wherein the database node is identified as experiencing the communications problem based at least in part upon failure to respond to a heartbeat processing message.

3. The method of claim 1, further comprising making a determination whether a TCP connection status is indicative that the database node has failed.

4. The method of claim 1, wherein the RDMA messaging is performed over multiple connections to the database node to determine whether the database node has failed.

5. The method of claim 4, wherein a client node comprises a first RDMA-enabled NIC, a server node comprises a second RDMA-enabled NIC, and each of the first and second RDMA-enabled NICs comprise two ports over which the RDMA messaging is performed over four connections between the client node and the server node to determine whether the database node has failed.

6. The method of claim 1, wherein multiple processing entities are employed to simultaneously check multiple paths for the RDMA messaging.

7. The method of claim 6, where the multiple processing entities comprise a foreground thread, a polling thread, and a reconnection thread.

8. The method of claim 1, further comprising evicting the database node from a database cluster after identifying the database node as a failed node.

9. A system, comprising:
    a processor;
    a memory for holding programmable code; and
    wherein the programmable code includes instructions executable by the processor for identifying that a database node is experiencing a communications problem; implementing RDMA messaging to the database node in response to identifying that the database node is experiencing the communications problem; determining whether the RDMA messaging is successful; identifying the database node as a failed node if the RDMA messaging to the database node is unsuccessful; and evicting the database node from a database cluster after identifying the database node as a failed node.

10. The system of claim 9, wherein the database node is identified as experiencing the communications problem based at least in part upon failure to respond to a heartbeat processing message.

11. The system of claim 9, wherein the programmable code further comprises instructions for making a determination whether a TCP connection status is indicative that the database node has failed.

12. The system of claim 9, wherein the RDMA messaging is performed over multiple connections to the database node to determine whether the database node has failed.

13. The system of claim 12, wherein a client node comprises a first RDMA-enabled NIC, a server node comprises a second RDMA-enabled NIC, and each of the first and second RDMA-enabled NICs comprise two ports over which the RDMA messaging is performed over four connections between the client node and the server node to determine whether the database node has failed.

14. The system of claim 9, wherein multiple processing entities are employed to simultaneously check multiple paths for the RDMA messaging.

15. The system of claim 14, where the multiple processing entities comprise a foreground thread, a polling thread, and a reconnection thread.

16. The system of claim 9, wherein the programmable code further comprises instructions for evicting the database node from a database cluster after identifying the database node as a failed node.

17. A computer program product embodied on a non-transitory computer readable medium, the non-transitory computer readable medium having stored thereon a sequence of instructions which, when executed by a processor, causes:
    identifying that a database node is experiencing a communications problem;
    implementing RDMA messaging to the database node in response to identifying that the database node is experiencing the communications problem;
    determining whether the RDMA messaging is successful;
    identifying the database node as a failed node if the RDMA messaging to the database node is unsuccessful; and
    evicting the database node from a database cluster after identifying the database node as a failed node.

18. The computer program product of claim 17, wherein the sequence of instructions further causes identification of the database node as experiencing the communications problem based at least in part upon failure to respond to a heartbeat processing message.

19. The computer program product of claim 17, wherein the sequence of instructions further performs making a determination whether a TCP connection status is indicative that the database node has failed.

20. The computer program product of claim 17, wherein the sequence of instructions further causes performing the RDMA messaging over multiple connections to the database node to determine whether the database node has failed.

21. The computer program product of claim 20, wherein a client node comprises a first RDMA-enabled NIC, a server node comprises a second RDMA-enabled NIC, and each of the first and second RDMA-enabled NICs comprise two ports over which the RDMA messaging is performed over four connections between the client node and the server node to determine whether the database node has failed.

22. The computer program product of claim 17, wherein the sequence of instructions further causes employing multiple processing entities to simultaneously check multiple paths for the RDMA messaging.

23. The computer program product of claim 22, where the multiple processing entities comprise a foreground thread, a polling thread, and a reconnection thread.

24. The computer program product of claim 17, wherein the sequence of instructions further causes evicting the database node from a database cluster after identifying the database node as a failed node.

* * * * *

UNITED STATES PATENT AND TRADEMARK OFFICE
CERTIFICATE OF CORRECTION

PATENT NO. : 11,556,407 B2
APPLICATION NO. : 16/948346
DATED : January 17, 2023
INVENTOR(S) : Masakazu Bando It is certified that error appears in the above-identified patent and that said Letters Patent is hereby corrected as shown below:

On the Title Page

Column 1, under Item (73) Assignee, Line 1, delete "Corporation" and insert -- Corporation (US) --, therefor.

On page 2, Column 1, under Item (56) Other Publications, Line 16, delete "et l.," and insert -- et al., --, therefor.

In the Specification

In Column 9, Line 33, delete "IB Verbs" and insert -- IBVerbs --, therefor.

In Column 9, Line 40, delete "IB Verbs" and insert -- IBVerbs --, therefor.

In Column 13, Line 25, delete "PTSN," and insert -- PSTN, --, therefor.

In Column 14, Line 57, delete "cloudservices" and insert -- cloud services --, therefor.

In Column 15, Line 62, delete "cloudservices" and insert -- cloud services --, therefor.

Signed and Sealed this
Twenty-fourth Day of October, 2023

Katherine Kelly Vidal
*Director of the United States Patent and Trademark Office*